Jan. 1, 1957 W. E. SARGEANT 2,776,379
CONSTANT FREQUENCY POWER SUPPLY
Filed Dec. 31, 1953 2 Sheets-Sheet 1
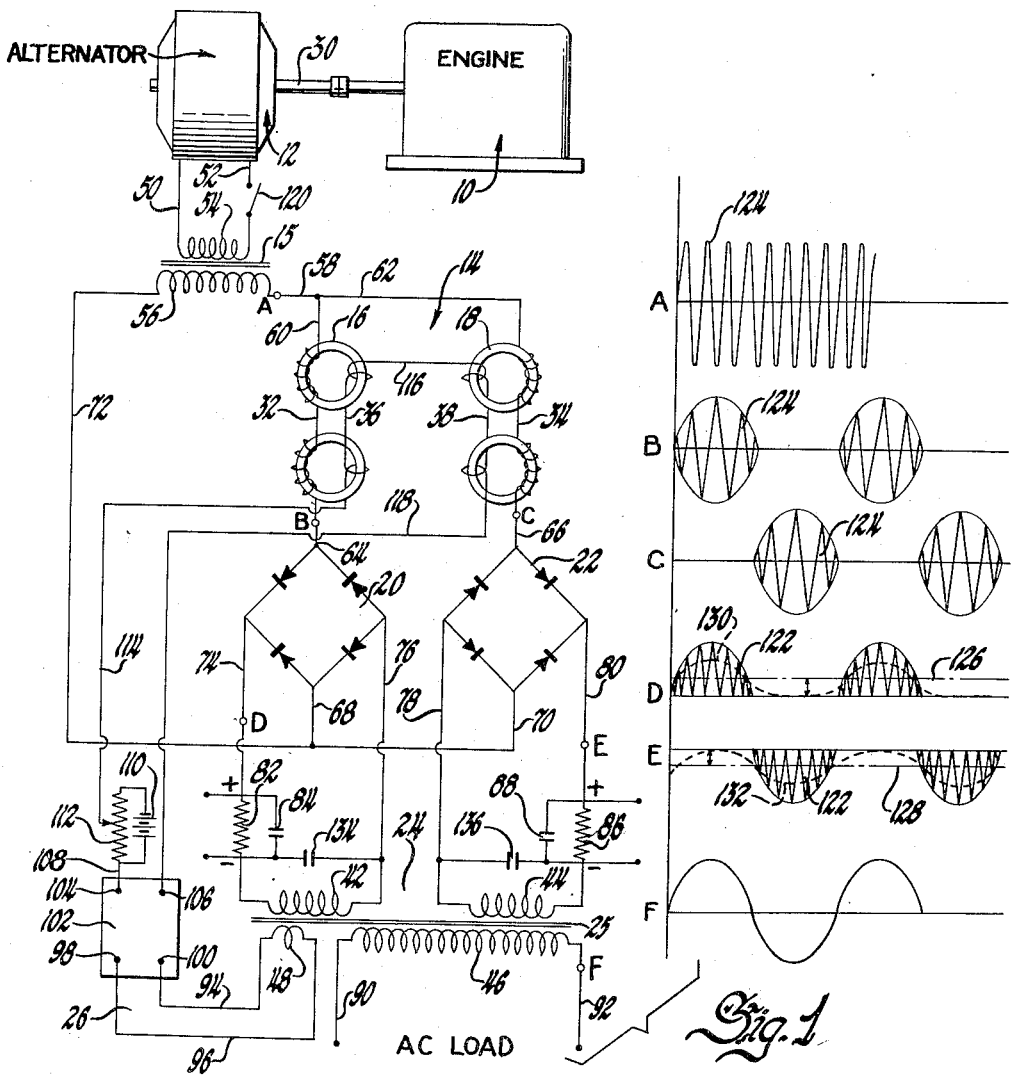
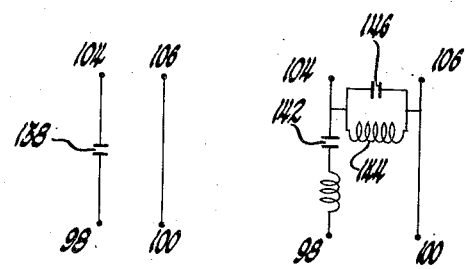
INVENTOR
Walter E. Sargeant
BY
C. D. Burch
ATTORNEY

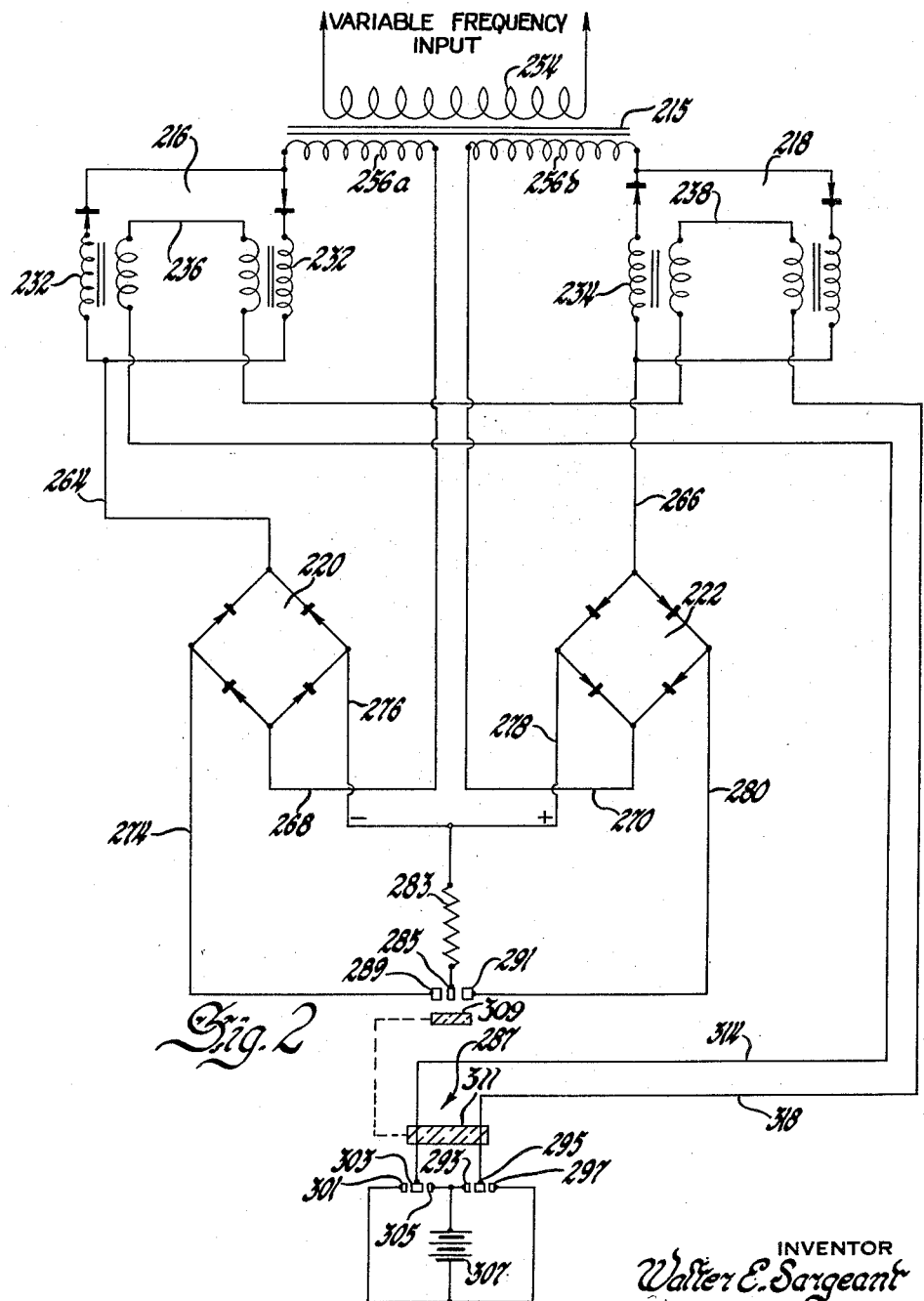

United States Patent Office 2,776,379
Patented Jan. 1, 1957

2,776,379

CONSTANT FREQUENCY POWER SUPPLY

Walter E. Sargeant, Huntington Woods, Mich., assignor to General Motors Corporation, Detroit, Mich., a corporation of Delaware Application December 31, 1953, Serial No. 401,664

14 Claims. (Cl. 307—72)

This invention relates to power translating means and, more particularly, to apparatus for deriving power of constant frequency from a source of varying frequency.

The invention is especially suited for use in combination with an alternator driven by a variable speed motor, such as an internal combustion engine, for supplying power of constant frequency to electrical apparatus as may be carried by mobile craft or vehicles. Prior to the invention various expedients including constant speed transmissions between the prime mover and the alternator have been employed for maintaining the speed and, thereby, the frequency of the alternator constant. Such mechanism is complex, costly and bulky and is not suited to installations which are subjected to shock and vibration and in which factors of weight, space and economy are of importance.

Accordingly, the present invention has for its general object to provide a constant frequency supply source which does not require a constant speed transmission nor other speed control mechanism for the generator or prime mover and which furnishes power of constant frequency independent of the speed at which the generator is driven.

Another object is to provide apparatus of the above character in which the output frequency is not of necessity related to the input frequency and which may have any desired appreciably lower value than the input frequency.

Another object is to provide such apparatus that can furnish direct current power in addition to constant frequency alternating current power without the use of direct current generating means.

Still another object is to provide apparatus of the above character which does not employ thermionic devices therein.

In accordance with the invention there is provided, in combination with an alternating current generator driven by a variable speed motor, a balanced magnetic amplifier which includes a pair of saturable reactors connected in push-pull relation through a pair of suitable detecting means to receive the variable frequency output of the generator. A part of the output of the detectors is regeneratively coupled through a positive feed-back circuit tuned to the desired output frequency and connected to the biased control windings of the reactors, thereby to modulate magnetically the alternator ouput applied through the variable impedance windings of the reactors. The demodulated outputs of the detectors are combined in such manner as to the cause the D. C. components thereof to have zero net effect in the combining means, thereby to avoid saturation thereof where the combining means is of a magnetic character. The recovered alternating current components of modulating frequency appearing in the detector outputs are algebraically combined and supplied to an alternating current load that operates at the modulating frequency.

In the drawings:

Figure 1 is a schematic electric circuit diagram of a preferred embodiment of the present invention in which the curves A to F represent wave forms appearing at various parts of the circuit;

Figures 1a and 1b are circuit details of a part of Figure 1; and

Figure 2 is a schematic electric circuit diagram of another embodiment of the invention.

Referring to the drawings, the schematic circuit diagram of Figure 1 constitutes a constant frequency supply source in accordance with a preferred embodiment of the present invention and comprises a prime mover 10, an alternator 12 and a balanced magnetic modulator-amplifier 14, which includes an input transformer 15, a pair of saturable reactors 16 and 18, a pair of balanced detectors or demodulators 20, 22, an output combining circuit 24 including an output transformer 25, and a regenerative feed-back circuit 26.

In mobile or portable installations the prime mover 10 may be a variable speed internal combustion engine directly coupled to the drive shaft 30 of the alternator 12 and may operate over a range of speeds of, say, from 2000 to 6000 R. P. M. The alternator is a conventional rotating induction machine which can be driven over the above range of speeds and is preferably of the type that does not employ a commutator, and is adapted to provide substantial alternating current power at a relatively high power frequency of, say, from 1500 to 4500 cycles per second. The saturable reactors 16 and 18 are conventional stacked ring core devices which may be of the type supplied under the trade name "Deltamax" by the Arnold Engineering Company. Each of the reactors has a power or variable impedance winding 32, 34 and a control winding 36, 38, respectively. While the reactor cores are illustrated in Fig. 1 as being of the annular variety, three legged cores also could be employed with the variable impedance winding distributed on the outer legs and the control winding placed on the central leg thereof. The reactors are designed to operate at the lowest frequency supplied by the alternator, 1500 cycles per second, in the present illustration, and should have a magnetization characteristic with a decidedly flat portion in the saturated region beyond the bend in the knee thereof.

The demodulators or detectors, 20, 22, may be conventional full wave dry type rectifier bridges. The combining and D. C. separating circuit 24 includes the output transformer 25 having a pair of primary windings 42, 44, a secondary winding 46 and an auxiliary winding 48. The auxiliary winding is associated with the feed-back circuit 26, which is described more fully below.

Conductors 50, 52 supply the power output of the alternator 12 to the input of the magnetic amplifier through the primary winding 54 of the input transformer 15. The secondary winding 56 of the input transformer 15 has the high potential side thereof connected over conductor 58 and branch conductors 60, 62, to one side of the variable impedance windings 32 and 34 of the saturable reactors, which are so wound or otherwise connected in the circuit relative to one another that the instantaneous voltages induced therein are of equal amplitude but oppositely directed. Otherwise stated, the reactors electrically are oppositely phased or connected in push-pull or flip-flop conducting relation. Conductors 64 and 66, respectively, connect the other side of each of the variable impedance reactor windings to an input terminal of a respective one of the rectifier bridges 20, 22, the diagonally opposite terminal of each of which is connected over a branch conductor 68 and 70, respectively, and line conductor 72 back to the low potential side of the input transformer secondary winding. The conjugate output terminals of each rectifier bridge are connected over respective conductor groups, as 74, 76 and 78, 80, to a D. C. load circuit composed of a resistor and condenser connected in parallel, as 82, 84 and 86, 88, and a series connected A. C. load circuit, which includes a respective one of the primary windings 42, 44 of the output transformer 40. The secondary winding 46 of the output transformer 40 is adapted to be connected over conductor 90, 92 to an alternating current load. The auxiliary winding 48 of the output transformer forms the input of the regenerative feed-back circuit 26 and couples a small fraction of the alternating output appearing in the detector circuits over conductors 94, 96 to the input terminals 98, 100 of a passive feed-back network 102, the latter being tuned to the desired frequency, say 180 C. P. S., at which alternating current power ultimately is to be supplied to the load. The output terminals 104, 106 of the feed-back network are connected in a series control circuit which extends from terminal 104 and includes a conductor 108, a potentiometer arrangement including a parallel connected biasing battery 110 and variable resistor 112, conductor 114, the control winding 36 of reactor 16, conductor 116, control winding 38 of reactor 18, and conductor 118 back to output terminal 106.

The operation of the circuit of Fig. 1 is as follows; the alternator 12 supplies power within the aforementioned frequency range of 1500 to 4500 C. P. S., depending upon the speed at which the alternator is being driven, the wave generated by the alternator having a form corresponding approximately to that shown by curve A.

After the engine 10 has been started, switch 120, which is connected in input conductor line 52, is closed to supply the alternator output to the balanced magnetic amplifier. The frequency selective regenerative feed-back circuit 26 is energized by the starting transients passing through the amplifier and selectively supplies a control wave corresponding to the desired output frequency of the system, 180 C. P. S., from the output of the magnetic amplifier to the serially connected biased control winding 36, 38 of the saturated reactors 16, 18. The control wave supplied from the output to the input of the amplifier should be of such phase as to aid the build-up of oscillations of control wave frequency in the system.

The battery 110 in the feed-back control circuit 26 energizes the control windings of the reactors so as to establish an operating point on the B–H magnetization characteristic of each of the reactors just beyond the bend in the knee of the curve thereof. The control windings are so wound or connected that the resultant biasing signal composed of the battery bias and the 180 cycle control signal from the feed-back network permits "conduction" of one of the reactors during one half of the period of the derived 180 cycle signal and permits conduction of the other reactor during the next succeeding half period thereof. The signal currents appearing on conductors 64 and 66 from the variable impedance windings of the reactors thus will be amplitude modulated in accordance with the 180 cycle control signal and will correspond approximately in form and be displaced in time as shown by curves B and C.

The rectifier bridges 20, 22 are oppositely poled and provide in the respective outputs thereof full wave rectified signals in the nature of those shown by curves D and E, the high frequency component 122 of each which curves is twice the frequency of the carrier or alternator signal 124. Each of the curves C and D may be represented by or is equivalent to a D. C. component corresponding to the average value of the curve and represented by the dashed-dot line 126 and 128, respectively, and a detected A. C. component represented by the dashed curves 130 and 132, respectively. The D. C. components appear across the individual load resistors 82 and 86, which limit the circulating current in the detector outputs. The alternating current components in the detector outputs are by-passed by the low-impedance condensers 84 and 88. Since the detectors 20 and 22 are oppositely poled, the D. C. components in the detector outputs will flow through the individual primary windings 42 or 44 with which each detector is associated in opposite directions, as indicated, to have zero net magnetization effect on the output transformer and thereby avoid saturation thereof.

The primary windings of the output transformer are so wound or connected as to algebraically combine the alternating current components in the outputs of the detectors, resulting in the wave shown by curve F the amplitude of which varies at the frequency of the modulating control signal. The high frequency double-carrier component 122 of curves D and E may be removed from the resultant de-modulated A. C. output by the by-pass condensers 134, 136 shunting the primary windings of the output transformer, as shown.

In its simplest form the feed-back network 102 may comprise a series condenser 138, as shown in Fig. 1A, such as to tune the system to the desired output frequency. In Fig. 1B the feed-back network is shown as a band-pass filter comprising a series combination of an inductance 140 and condenser 142 shunted by a parallel combination of inductance 144 and condenser 146, the values of which are proportioned to pass only such component waves impressed upon the input terminals thereof as correspond to the desired modulating control wave. As an additional refinement, the feed-back ratio could be varied, if desired, by means of an A. V. C. circuit so as to obtain more nearly perfect output wave forms and constant amplitude independent of engine speed.

In place of the regenerative feed-back oscillator control crcuiit, the modulating control wave could be obtained, if desired, from a separate small low-power audio source using vacuum tubes, inverters or other suitable means.

An electro-mechanical frequency converter in accordance with one of the latter forms which the invention may assume is illustrated in Fig. 2 in which the input transformer 215 is provided with a pair of secondary windings 256a and 256b for converting from an unbalanced input to a balanced output.

Thhe saturable reactors 216 and 218 shown in the circuit of Fig. 2 are of the self-saturating variety, the variable impedance windings 232 and 234 of respective ones of which are connected to one side of the secondary winding 256a or 256b of the input transformer and over conductor 264 or 266 to one of the input terminals of a rectifier bridge 220 or 222 the diagonally opposite terminal of which is connected over conductor 268 or 270 back to the other side of the secondary winding 256a or 256b. The full-wave rectified output of each of the rectifier or detector bridges 220 and 222 is supplied from their conjugate output terminals over conductors 274, 276 and 278, 280, with conductors 276 and 278 of opposite polarity being connected together to supply current to one side of an A. C. load 283, as shown. The other side of the A. C. load is connected to a central segment 285 of a synchronous commutator or vibrator 287 which has a pair of co-operating segments 289 and 291 respectively connected to conductors 274 and 280, as shown.

The synchronous commutator or interrupter device 287 is provided with two additional sets of commutating segments 293, 295, 297 and 301, 303, 305 which are associated with a direct current supply source 307, as shown. The central segments 295 and 303 of the aforementioned additional sets of commutating segments are connected over conductors 314 and 318 to supply a substantially square-wave control signal from the inverter device 287 to the serially connected control windings 236 and 238 of the reactors.

Where the inverter device 287 is of the vibratory reed variety, the central switching contacts or segments 285, 295 and 303 are movable to contact periodically and alternately contacts 289, 291; 293, 297; and 301, 305 associated with respective ones of which segments, where the inverter is of the rotary commutator variety, the switching may be accomplished as by stationary brushes 309, 311. In either case, the switching is accomplished at a rate to provide a control signal corresponding to the desired output frequency of the system. The inverter should be so phased or synchronized that the switching, say at load segment 291 occurs just when the A. C. current from the detector outputs is passing through zero.

The wave forms appearing in the circuit of Fig. 2 are generally related to and will have the same relative positions in time as those shown in connection with Fig. 1. In the case of Fig. 2, however, no direct-current component appears in the outputs of the rectifiers and the load since each half of the balanced amplifier circuit is open for one alternation of the control wave cycle.

In Fig. 1 the D. C. load resistors could be replaced, if desired, by a "bucking" battery furnishing a potential of the same magnitude as that developed across the resistors, in which case the D. C. output of the system can be stored in the battery instead of being dissipated in the form of heat generated in the current limiting resistors.

I claim:

1. The combination with a source of power of varying frequency, of control apparatus for converting input power of varying frequency to output power of constant frequency comprising, variable impedance means having a power circuit and a control circuit affecting the impedance of said variable impedance means, detector means having an input circuit connected to said variable impedance means and an output circuit, and control means connected to said control circuit of said variable impedance means and supplying periodically varying control current thereto having a frequency corresponding to the output frequency of said control apparatus.

2. The combination with a source of power of varying frequency, of control apparatus for converting input power of varying frequency to output power of constant frequency comprising, variable impedance means having a power circuit and a control circuit affecting the impedance of said variable impedance means, detector means having an input circuit connected to said variable impedance means and an output circuit, and control means connected to said control circuit of said variable impedance means and supplying control power thereto corresponding to the output frequency of said control apparatus, said control means including frequency selective, regenerative feed-back means connected from the output of said control apparatus to said control circuit of said variable impedance means, said frequency selective regenerative feed-back means being tuned to the output frequency of said control apparatus.

3. The combination with a source of power of varying frequency, of control apparatus for converting input power of varying frequency to output power of constant frequency comprising, variable impedance means having a power circuit and a control circuit affecting the impedance of said variable impedance means, detector means having an input circuit connected to said variable impedance means and an output circuit, and control means connected to said control circuit of said variable impedance means and supplying control power thereto corresponding to the output frequency of said control apparatus, said control means including periodically operating interrupting means operating at a frequency corresponding to the output frequency of said control apparatus and supplying control power to said control circuit of said variable impedance means.

4. The combination with an alternator driven by a variable speed prime mover, of control apparatus for producing alternating current power of constant frequency independent of the speed at which the alternator is driven, said apparatus comprising variable impedance means having a power circuit and a control circuit affecting the impedance of said variable impedance means, detector means having an input circuit connected to said variable impedance means and an output circuit, and control means connected to said control circuit of said variable impedance means and supplying control power thereto corresponding to the output frequency of said control apparatus.

5. The combination with an alternator driven by a variable speed prime mover, of control apparatus for producing alternating current power of constant frequency independent of the speed at which the alternator is driven, said apparatus comprising variable impedance means having a power circuit and a control circuit affecting the impedance of said variable impedance means, detector means having an input circuit connected to said variable impedance means and an output circuit, and control means connected to said control circuit of said variable impedance means and supplying control power thereto corresponding to the output frequency of said control apparatus, said output circuit of said detector means having circuit means therein developing direct current thereacross and an alternating current load circuit therein supplying alternating current power of said output frequency to an alternating current load.

6. In combination, a source of alternating current power of varying frequency, a pair of variable impedance means connected in push-pull balanced relation and each having a variable impedance circuit and a control circuit affecting the impedance of said variable impedance means, detector means for each of said variable impedance means and having an input circuit connected to said alternating current source through said variable impedance circuit of a respective one of said variable impedance means and an output circuit, and control means connected to the said control circuit of said variable impedance means and supplying control power thereto of a frequency different from that of said variable frequency power source.

7. In combination, a source of alternating current power of varying frequency, a pair of variable impedance means connected in push-pull balanced relation and each having a variable impedance circuit and a control circuit affecting the impedance of said variable impedance means, detector means for each of said variable impedance means and having an input circuit connected to said alternating current source through said variable impedance circuit of a respective one of said variable impedance means and an output circuit, and control means connected to the said control circuit of said variable impedance means and supplying control power thereto of a frequency different from that of said variable frequency power source, said control means including frequency-selective, regenerative feed-back means coupling a part of the output of said detector means to said control circuit of said variable impedance means.

8. In combination, a source of alternating current power of varying frequency, a pair of variable impedance means connected in push-pull balanced relation and each having a variable impedance circuit and a control circuit affecting the impedance of said variable impedance means, detector means for each of said variable impedance means and having an input circuit connected to said alternating current source through said variable impedance circuit of a respective one of said variable impedance means and an output circuit, and control means connected to the said control circuit of said variable impedance means and supplying control power thereto of a frequency different from that of said variable frequency power source, said control means including periodically operating interrupting means supplying control power to said control circuit of said variable impedance means.

9. In combination, a source of alternating current power of varying frequency, a pair of variable impedance means connected in balanced relation and each having a variable impedance circuit and a control circuit affecting the impedance of said variable impedance circuit, detector means for each of said variable means and having an input circuit connected to said alternating current source through said variable impedance circuit of a respective one of said variable impedance means and an output circuit, and control means connected to the said control circuit of said variable impedance means and supplying control power thereto of a frequency different from that of said variable frequency power source, the output of said detecting means including a direct current component and an alternating current component having a frequency corresponding to that of the control power supplied by said control means, and means connected to the output circuits of said detecting means additively combining the said alternating current components thereof and differentially combining the said direct current components thereof.

10. In combination, a main source of alternating current of varying frequency, a balanced magnetic amplifier including a pair of saturable reactors each having a variable impedance winding and a control winding, detector means for each of said reactors, each of said detector means having an input circuit connected to said main power source through the variable impedance winding of a respective one of said reactors and an output circuit, and a control circuit connected to the said control winding of each of said reactors and supplying control power of a frequency different from that of said source of alternating current to the said control windings of said reactor means.

11. In combination, a main source of alternating current of varying frequency, a balanced magnetic amplifier including a pair of saturable reactors each having a variable impedance winding and a control winding, detector means for each of said reactors, each of said detector means having an input circuit connected to said main power source through the variable impedance winding of a respective one of said reactors and an output circuit, and a control circuit connected to the said control winding of each of said reactors and supplying control power of a frequency different from that of said source of alternating current to the said control windings of said reactor means said control circuit including periodically operating interrupting means alternately connecting the said output circuits of said detector means to an alternating current load adapted to be supplied thereby.

12. In combination, a main source of alternating current of varying frequency, a balanced magnetic amplifier-modulator including a pair of saturable reactors each having a variable impedance winding and a control winding, detector means for each of said reactors, each of said detector means having an input circuit connected to said main power source through said variable impedance winding of a respectively associated one of said reactors and an output circuit, and a control circuit connected to the said control winding of each of said reactors and supplying control power of a frequency different from that of said source of alternating current to the said control windings of said reactor means.

13. In combination, a main source of alternating current of varying frequency, a balanced magnetic amplifier-modulator including a pair of saturable reactors each having a variable impedance winding and a control winding, detector means for each of said reactors, each of said detector means having an input circuit connected to said main power source through said variable impedance winding of a respectively associated one of said reactors and an output circuit, and a control circuit connected to the said control winding of each of said reactors and supplying control power of a frequency different from that of said source of alternating current to the said control windings of said reactor means said control circuit including an oscillatory feed-back network therein regeneratively coupling a fraction of the output of said detector means to the said control windings of said reactors.

14. In combination, a main source of alternating current of varying frequency, a balanced magnetic amplifier including a pair of saturable reactors each having a variable impedance winding and a control winding, detector means for each of said reactors, each of said detector means having an input circuit connected to said main power source through the said variable impedance winding of a respectively associated one of said reactors and an output circuit, a direct current work circuit for each of said detecting means and an alternating current work circuit including an output transformer having a pair of primary windings connected to respective ones of said output circuits of said detecting means and a secondary winding, and a control circuit connected to the said control winding of each of said reactors and supplying control power of a frequency different from that of said source of alternating current to the said control windings of said reactor means.

References Cited in the file of this patent

UNITED STATES PATENTS

| | | |
|---|---|---|
| 1,386,830 | Alexanderson | Aug. 9, 1921 |
| 2,164,383 | Burton | July 4, 1939 |